F. PETRAK.
TRACTION WHEEL OF THE PORTABLE TRACK TYPE.
APPLICATION FILED MAR. 24, 1915.

1,191,908.

Patented July 18, 1916.
2 SHEETS—SHEET 2.

UNITED STATES PATENT OFFICE.

FRANK PETRAK, OF QUINCY, WASHINGTON.

TRACTION-WHEEL OF THE PORTABLE-TRACK TYPE.

1,191,908.   Specification of Letters Patent.   Patented July 18, 1916.

Application filed March 24, 1915. Serial No. 16,655.

*To all whom it may concern:*

Be it known that I, FRANK PETRAK, a citizen of the United States, residing at Quincy, in the county of Grant and State of Washington, have invented certain new and useful Improvements in Traction-Wheels of the Portable-Track Type, of which the following is a specification.

This invention relates to improvements in wheels, more specifically, to traction wheels of the portable track type.

The object of my invention is to provide a wheel that will automatically place a relatively broad and level track upon the earth as the vehicle upon which said wheel is mounted moves either forwardly or backwardly. This track affords a perfectly smooth passage as well as gripping means for the propulsion of the vehicle. This is accomplished regardless of the character of the soil over which the vehicle is passing. Easy progress is insured, since slipping or miring of the wheel is impossible. It is obvious that this will result in a great saving of power necessary to move large and heavy tractors. In addition to being extremely efficient in operation, my wheel is simple and durable in construction, and worn parts may be replaced with little trouble and at small cost.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Figure 1:
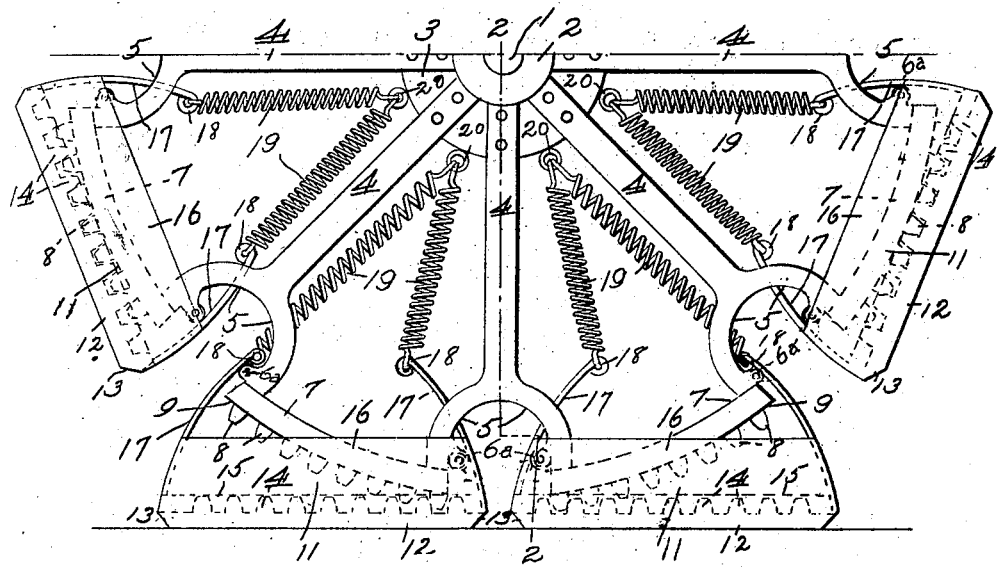
Figure 2:
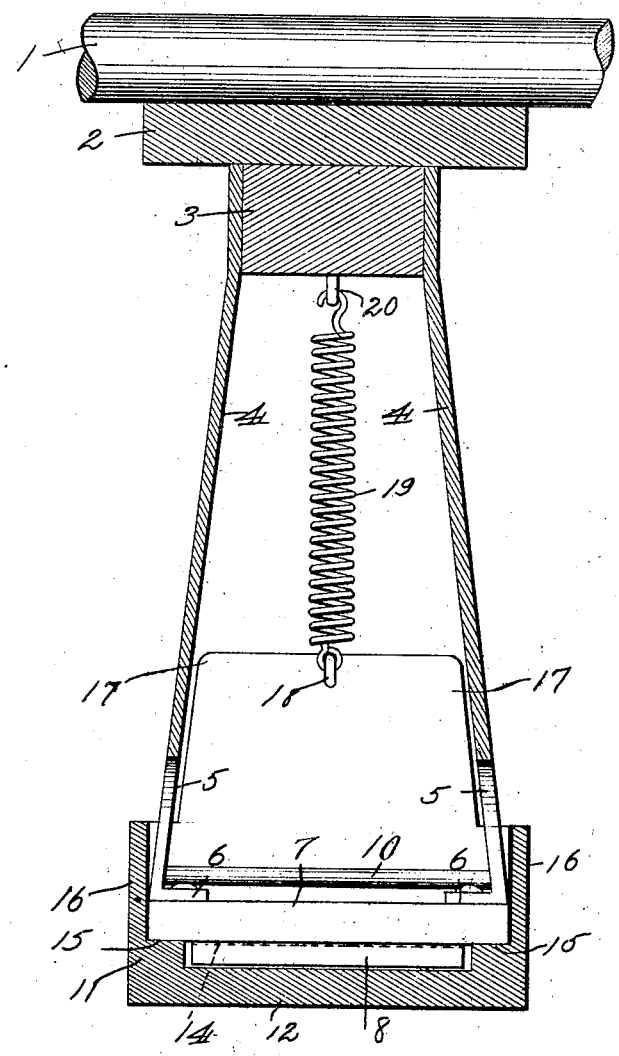

Referring now to the drawings, which are merely illustrative of my invention, Figure 1 is a side elevation of one-half of my improved traction wheel illustrating the manner in which the shoes automatically adjust themselves to form a portable track for the wheel. Fig. 2 is a vertical sectional view taken on the line 2—2 of Fig. 1. Fig. 3 is a detail longitudinal sectional view of one of the shoes.

Referring further to the drawings, wherein similar reference characters designate similar parts throughout the respective views, 1 designates an axle, upon which is mounted a wheel generally designated by 2. To the hub 3 of the wheel is secured a plurality of spokes 4 on each side thereof, the outer extremities of said spokes being provided with bifurcated portions 5, each leg of the bifurcated portions having an inwardly extending flange 6 formed thereon, and an inwardly extending ear $6^a$ formed on each leg of the bifurcations. The rim of the wheel is formed in segments by means of a plurality of plates 7, each of which is secured at the ends thereof to the flanges 6 of the adjacent legs of two of the spokes. Each of said segment plates is formed with peripherally disposed gear teeth 8, which are centrally arranged transversely of each of said plates. A tread rim 9 is formed upon both sides of said gear teeth longitudinally of said plates. An idler roller 10 is pivotally mounted at one end upon the ear $6^a$ of the spoke 4 and at the opposite end upon the corresponding ear upon the spoke transversely opposite. A plurality of shoes, generally designated by 11, are adapted to fit over each of the segment plates, and are formed with a substantially rectangular base plate 12 having beveled ends 13, and integrally formed gear teeth 14 on the upper face thereof. Said gear teeth extend transversely of the plate and are spaced apart along the length thereof. The teeth 14 are centrally disposed transversely of the plate 12 and a track 15 is formed on both sides of said teeth upon which the tread rims 9 of the segment plates 7 are adapted to run. The plate 12 is relatively wider than the segment plates 7 of the wheel, and upstanding flanges or side plates 16, which are secured along both sides of the base plate, are adapted to maintain the shoe in perfect alinement with respect to each of the segment plates of the wheel. Upwardly and inwardly curved hangers 17 are formed integrally with the ends of each of said shoes 11, the upper ends of said hangers being provided with an eye 18 adapted to receive one end of a tension spring 19, the other end thereof being secured to the hub 3 of the wheel by means of an eye 20. The idler rollers 10 are adapted to contact with the inner face of the hangers 17 so as to hold the shoes in place upon the segment plate and also to make their operation more certain.

It is obvious from the construction of the cooperating elements that as the shoes 11 are adapted to seat over the segment plates 7, which form the rim of the wheel, and are held in spaced apart relation circumferentially thereof by means of tension springs 19 interposed between them and the hub of the wheel, that the gear teeth of the wheel will mesh with the gear teeth of the shoe, and the tread rims of the wheel will travel upon the track on the shoe. From this it is seen that as the wheel revolves, the shoe will be forced into a horizontal plane as soon as the weight of the wheel rests upon one end of the shoe, and that a continuous level track is thus provided along the full length of the shoe, each shoe operating in succession in the same manner. It is also obvious that as the entire weight will rest upon the track, the gears will merely transmit the propulsive energy.

The utility, adaptability, and advantages of my improved form of traction wheel of the portable track type being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to secure by Letters Patent is:

1. In a traction wheel, in combination with the hub of a wheel, a plurality of spokes secured to said hub, said spokes provided with bifurcated portions on their outer extremities, segment plates secured to the adjacent legs of said spokes, gear teeth formed on the outer faces of said plates, a plurality of shoes each adapted to cover one of said segment plates, gear teeth formed on the inner faces of said shoes adapted to mesh with said gear teeth on said plates, and means secured to said shoes and said wheel whereby said shoes are retained in engagement with said plates.

2. In a traction wheel, in combination, a wheel formed in segments, gear teeth formed on the outer face of said wheel, a plurality of geared shoes adapted to engage said wheel, and resilient means interposed between said shoes and said wheel adapted to retain said shoes in contact with said wheel.

3. In a traction wheel, in combination with the hub of a wheel, a plurality of radial spokes secured to said hub, bifurcated portions formed on the outer extremities of said spokes, segment plates secured to the adjacent sides of said bifurcated portions, gear teeth formed on the outer faces of said plates, tread rims formed on said plates, a plurality of shoes each adapted to engage one of said plates, gear teeth formed on the upper faces of said shoes adapted to mesh with the gear teeth of said plates, a track formed on said shoe adapted to contact with said tread rims, and means secured to said hub adapted to retain said shoes in engagement with said plates.

4. In a traction wheel, in combination, a hub, spokes radially disposed in pairs from said hub, radially disposed legs formed on each of said spokes, segment plates interposed between the adjacent legs of each two of said spokes, gear teeth formed on the outer face of said segment plates, tread rims formed on both sides of said gear teeth, a shoe adapted to seat upon each of said segment plates, gear teeth formed on the inner face of said shoe adapted to mesh with the gear teeth on said segment plate, and resilient means interposed between said shoes and said hub.

5. The combination in a traction wheel, of a wheel having a rim formed with a plurality of segmental sections rigidly connected, ground engaging elements associated with said sections, the free end portions of said ground engaging elements being yieldably connected with the hub of the wheel, and anti-friction means associated with said ground engaging elements to facilitate their oscillation during operation, whereby to permit said elements to automatically adjust themselves to the surface of the ground over which the wheel is traveling.

6. In a traction wheel, a body having a rim formed of a plurality of segmenal sections rigidly connected, ground engaging shoes detachably associated with said sections, the free ends of said shoes being yieldably connected with the hub of the wheel, guiding means for said shoes, and means for transmitting the peripheral motion of said wheel to said ground engaging elements.

7. In a traction wheel, a body having a rim portion formed of a plurality of rigidly connected sections, shoes detachably carried by said sections and having their free ends in intimate relationship, gear teeth carried by the sections of said rim, and complemental teeth formed on the ground engaging elements for engaging the first said teeth, and means for yieldably connecting the free ends of said ground engaging elements with the hub portion of said wheel.

In testimony whereof I affix my signature in the presence of two witnesses.

FRANK PETRAK.

Witnesses:
 JOHN O. CONNELL,
 ILLET ENGBRETSQN.